(12) United States Patent
Marquez et al.

(10) Patent No.: US 11,082,854 B2
(45) Date of Patent: Aug. 3, 2021

(54) SIGNAL VALIDATION FOR SECURE RANGING

(71) Applicant: Apple Inc., Cupertino, CA (US)

(72) Inventors: Alejandro J. Marquez, Sunnyvale, CA (US); Dinesh Poopalaratnam, Sunnyvale, CA (US); Shang-Te Yang, San Jose, CA (US); Indranil Sen, Cupertino, CA (US); Peiyu Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 16/586,713

(22) Filed: Sep. 27, 2019

(65) Prior Publication Data
US 2021/0099884 A1 Apr. 1, 2021

(51) Int. Cl.
| | | |
|---|---|---|
| *H04W 12/12* | (2021.01) | |
| *H04B 17/345* | (2015.01) | |
| *G01S 11/06* | (2006.01) | |
| *H04L 25/02* | (2006.01) | |
| *H04W 76/14* | (2018.01) | |
| *H04B 17/336* | (2015.01) | |

(52) U.S. Cl.
CPC ............. *H04W 12/12* (2013.01); *G01S 11/06* (2013.01); *H04B 17/336* (2015.01); *H04B 17/345* (2015.01); *H04L 25/0212* (2013.01); *H04W 76/14* (2018.02)

(58) Field of Classification Search
CPC .................................................... H04W 12/12
See application file for complete search history.

(56) References Cited

U.S. PATENT DOCUMENTS

| | | | | |
|---|---|---|---|---|
| 7,394,864 B2 * | 7/2008 | Webster | .............. | H04L 25/0212 375/219 |
| 7,453,961 B1 * | 11/2008 | Li | .......... | G01C 21/206 342/357.61 |
| 2006/0035676 A1 * | 2/2006 | Sayers | ................... | H01Q 1/246 455/562.1 |
| 2010/0054304 A1 * | 3/2010 | Barnes | ................. | H04B 1/7183 375/130 |
| 2017/0041043 A1 * | 2/2017 | Secall | ...................... | H04B 1/40 |

\* cited by examiner

*Primary Examiner* — Hsinchun Liao
(74) *Attorney, Agent, or Firm* — Morgan, Lewis & Bockius LLP (57) ABSTRACT

A device implementing signal validation for secure ranging includes at least one processor configured to obtain a channel estimate based at least in part on a signal received from an other device over a channel. The at least one processor may be further configured to determine an average noise level of a beginning portion of the channel estimate and establish a direct path signal acceptance level for the channel estimate based at least in part on the average noise level. The at least one processor may further configured to identify a candidate direct path signal for the channel in a remaining portion of the channel estimate and validate the candidate direct path signal as a direct path signal for the channel when a signal level corresponding to the candidate direct path signal satisfies the direct path signal acceptance level, otherwise reject the candidate direct path signal as the direct path signal for the channel.

20 Claims, 7 Drawing Sheets

SIGNAL VALIDATION FOR SECURE RANGING

TECHNICAL FIELD

The present description relates generally to signal validation, including signal validation for secure ranging.

BACKGROUND

Ranging applications may be used by electronic devices to estimate a distance from a first device, such as a mobile device, to a second device, such as a secure electronic device. The distance estimation may be used to verify that the first device is within a particular distance of the second device, such as a particular distance that may be associated with performing a particular operation on the second device, e.g. unlocking the second device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more implementations, structures and components are shown in block diagram form in order to avoid obscuring the concepts of the subject technology.

Secure ranging applications may be used by devices to securely estimate a distance between the devices. The estimated distance may be used to verify that the devices are located within a particular distance that may be required for allowing one of the devices to effectuate a secure operation on the other device, such as unlocking the other device. The secure ranging applications may rely on the accurate detection of the direct/first path, or line-of-sight path, between the devices to accurately estimate the distance between the electronic devices. However, in some multipath environments, algorithms that search for the direct path signal (e.g., multiple signal classification (MUSIC), estimation signal parameters via rotational invariance technique (ESPRIT), etc.) may be susceptible to a man-in-the-middle attack by a third party.

For example, a third party device may inject noise into a channel between two other devices which may, under certain conditions, create a peak that may be detected as the direct path signal between the two other devices. The misdetection of the direct path signal may result in the distance between the devices being inaccurately estimated as less than the actual distance between the devices, which may allow the third party device to improperly effectuate a secure operation on one the devices, such as unlocking the device.

The subject system may strengthen the security of secure ranging between two devices by implementing a direct path signal acceptance threshold that may be configured based on an average noise level determined from initial samples of a channel estimate (e.g., a channel impulse response) for the channel between the devices. For example, the direct path signal acceptance threshold may be configured to be the average noise level plus a threshold amount (e.g., 5 dBm, 10 dBm, or any amount). The direct path signal acceptance threshold may then be used to validate that a detected direct path signal corresponds to the actual direct path signal, e.g., when the signal level associated with the detected direct path signal exceeds the direct path acceptance level threshold. If the signal level corresponding to the detected direct path signal does not satisfy the direct path signal acceptance threshold, then the subject system may not allow the secure operation to be performed, thereby strengthening and/or improving the security of the secure ranging.

The subject system may further improve the security of secure ranging between devices when a signal exchange is utilized for estimating the distance between the devices. For example, the detected direct path signal of each of the exchanged signals may be validated, and the relative positions of the detected direct path signals in the respective channel estimates may be compared to verify that the positions generally coincide with one another, as would be expected in a reciprocal channel. If the detected direct path signal of any of the exchanged signals does not satisfy its direct path signal acceptance threshold, or if the relative positions of the detected direct path signals in their respective channel estimates do not generally coincide, the subject system may not allow the secure operation to be performed, thereby strengthening and/or improving the security of the secure ranging.

Figure 1:
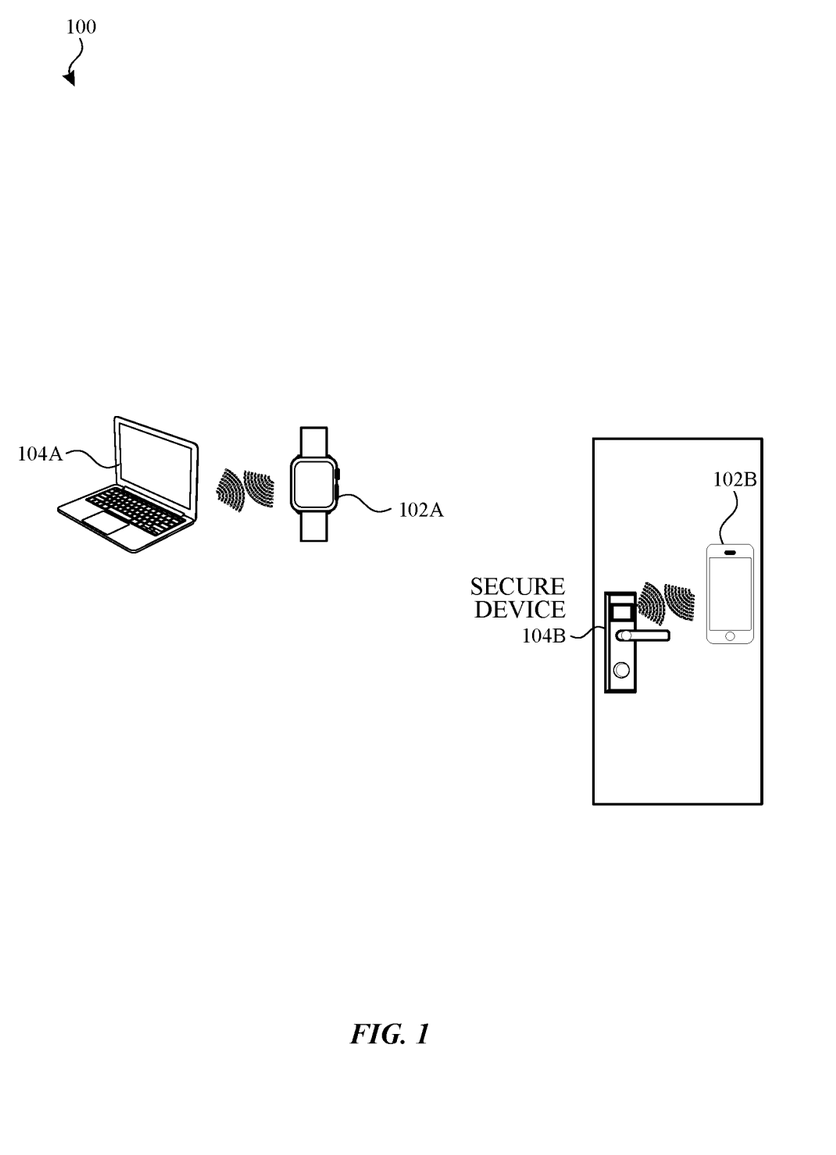
FIG. 1 illustrates an example network environment in which signal validation for secure ranging may be implemented in accordance with one or more implementations.

FIG. 1 illustrates an example network environment 100 in which signal validation for secure ranging may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-B and one or more secure devices 104A-B. Two or more of the devices 102A-B, 104A-B may be communicatively coupled by a network and/or by a direct, e.g., peer-to-peer connection. For example, one or more of the electronic devices 102A-B may communicate with one or more of the secure devices 104A-B via direct, e.g. peer-to-peer, wireless network connections, such as Wi-Fi Direct connections, APPLE wireless direct link (AWDL) connections, Bluetooth connections, or generally any wireless network connections that may be used to perform a signal exchange, as well as wireless network connections, such as infrastructure basic service set (BSS) connections, through an intermediary network device, such as a wireless router.

The electronic devices 102A-B may be, for example, portable computing devices such as laptop computers, smartphones, peripheral devices (e.g., digital cameras, headphones), tablet devices, wearable devices (e.g., watches, bands, etc.), keyfobs, or other appropriate devices that include one or more wireless interfaces, such as one or more NFC radios, WLAN radios, Bluetooth radios, Zigbee radios, cellular radios, and/or other wireless radios. In FIG. 1, by way of example, the electronic devices 102A is depicted as a smartwatch, and the electronic device 102B is depicted as a mobile phone. One or more of the electronic devices 102A-B may be, and/or may include all or part of, the electronic device discussed below with respect to FIG. 2 3, and/or the electronic system discussed below with respect to FIG. 7.

The secure devices 104A-B may be, for example, electronic devices that implement security mechanisms, such as laptops, tablet devices, and the like, secure devices included in and/or coupled to access devices, such as doors, locks, etc., secure devices included in and/or coupled to automotive/vehicle devices, and/or any devices that include one or more wireless interfaces that may be used to grant one or more access rights and/or perform one or more corresponding operations, such as NFC radios, wireless local area network (WLAN) radios, Bluetooth radios, Zigbee radios, cellular radios, and/or other wireless radios. In FIG. 1, by way of example, the secure device 104A is depicted as a laptop and the secure device 104B is depicted as a device included in and/or coupled to an access device, such as a door lock. One or more of the secure devices 104A-B may be, and/or may include all or part of, the electronic system discussed below with respect to FIG. 7.

In one or more implementations, authorized users of the electronic devices 102A-B may have respective user accounts with one or more of the service providers. The user accounts may be used to establish and/or manage devices and/or digital credentials (e.g., digital keys) for accessing one or more of the secure devices 104A-B.

In one or more implementations, one or more of the electronic devices 102A-B, such as the electronic device 102A, may be paired with and/or associated with one or more of the secure devices 104A-B. For example, the owner (or primary authorized user) of the secure devices 104A-B may pair their electronic device, e.g. the owner electronic device 102A (or owner device), with the secure devices 104A-B. The pairing process may include, for example, the secure devices 104A-B providing one or more keys (e.g., private keys) to the electronic device 102A that can be used by the electronic device 102A to sign access commands/operation requests provided to the secure devices 104A-B, such as to unlock the secure devices 104A-B. In this manner, the secure devices 104A-B can confirm that the access commands/operation requests were issued by the electronic device 102A.

In one or more implementations, one or more of the access commands may be associated with a particular distance threshold that may need to be satisfied by the distance between the electronic device 102A and the respective secure devices 104A-B in order for the access commands to be performed. For example, an electronic device 102A may need to be within a particular distance, e.g. 3 meters, to unlock a secure device 104A. Thus, one or more of the electronic devices 102A-B, may exchange/communicate one or more signals with one or more of the secure devices 104A-B to perform one or more secure ranging operations, such as to determine (or estimate) the distance (e.g., line of sight distance corresponding to the direct/first path) between the electronic devices 102A-B and the secure devices 104A-B. An example signal exchange for a secure ranging operation is discussed further below with respect to FIG. 3.

The line of sight distance estimation between two devices, such as the electronic device 102A and the secure device 104A, may be determined based on the time of flight for a signal communicated between the devices 102A, 104A. Time of flight may refer to the time it takes for the signal (e.g., a radio wave carried message) to propagate from the transmitting device, such as the electronic device 102A, to a receiving station, such as the secure device 104A. The distance between the transmitting station and the receiving station may be utilized for a ranging estimation based on the following relation: distance=c×ToF, where distance is the distance between the transmitting and the receiving station at a point in time, ToF is the time of flight for a signal to propagate between the electronic device 102A and the secure device 104A, and c is the speed of light ($3 \times 10^8$ m/s).

Thus, the accuracy of the distance estimation between any two of the electronic devices 102A-B and the secure devices 104A-B, may be dependent on an accurate time of flight measurement, which in turn may be dependent on an accurate time of arrival estimation of a signal received by one or more of the electronic devices 102A-B, as is discussed further below with respect to FIG. 3.

In one or more implementations, the time of arrival estimation may be determined using a channel estimate, such as a channel impulse response, of a communication channel between one or more of the electronic devices 102A-B and one or more of the secure devices 104A-B. For example, the channel impulse response may be utilized to detect the direct path between the devices. However, in certain multipath environments, a third-party may be able to inject noise into the channel which, when received at the beginning of the channel estimate, may create a peak that may be inaccurately detected as the direct path signal. Thus, under specific conditions the third-party may be able to bypass/work-around the particular distance threshold for a given access command, and therefore may be able to improperly effectuate the given access command at one or more of the secure devices 104A-B.

The subject system implements a direct path signal acceptance threshold to prevent the inaccurate detection of a peak created by injected noise as the direct path signal. The direct path signal acceptance threshold may be determined based on an average noise level for the samples within a configurable window at the beginning of the channel estimate. For example, the direct path signal acceptance threshold may be set as the average noise level plus a configurable threshold amount, such as 5 dBm, 10 dBm, or any amount. The signal level corresponding to a detected (e.g., candidate) direct path signal may then be compared to the direct path signal acceptance threshold. If the signal level corresponding to the candidate direct path signal does not satisfy the direct path signal level threshold, the candidate direct path signal is rejected. An example channel impulse response is discussed further below with respect to FIG. 4, and an example process for validating candidate direct path signals is discussed further below with respect to FIG. 5.

The subject system may be further implemented into a secure ranging signal exchange, such as the signal exchange discussed further below with respect to FIG. 3. For example, the subject system can be used to validate the detected direct path signal for each of the signals communicated in the signal exchange. In addition, the position of each of the direct path signals within their respective channel estimates, e.g. the direct path distance, can be compared between each of the exchanged signals to verify that the direct path distances generally coincide with one another (e.g., within a threshold amount), as would be expected in a reciprocal channel. An example process of implementing the subject system into a secure ranging signal exchange is discussed further below with respect to FIG. 6.

Figure 2:
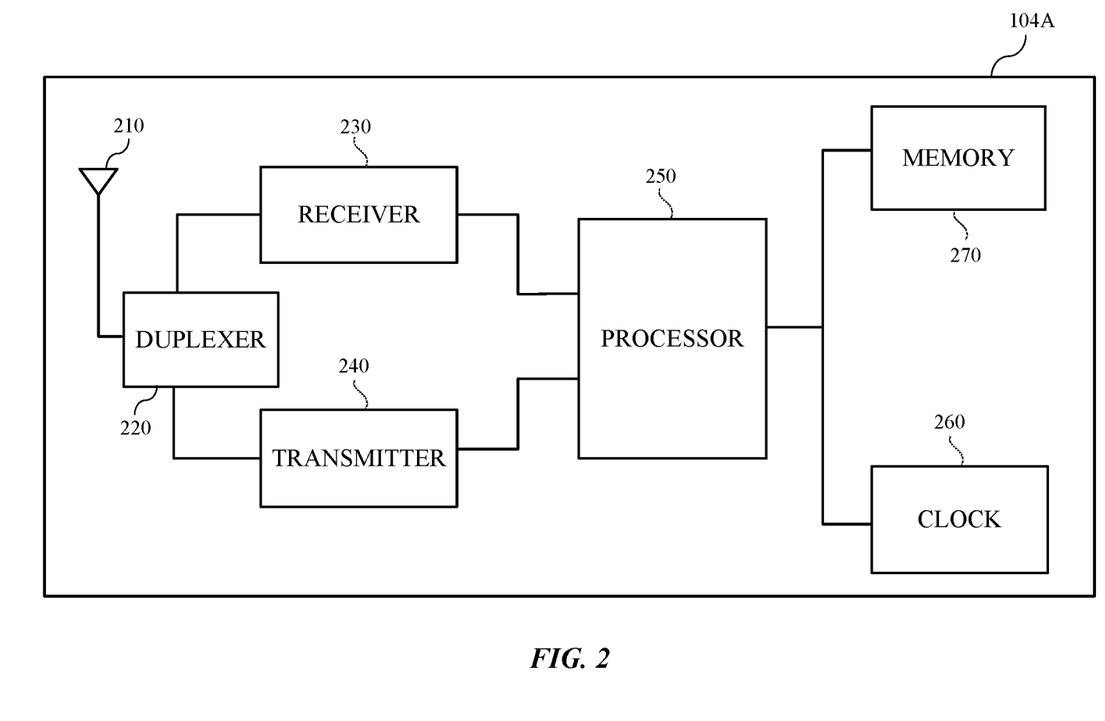
FIG. 2 illustrates an example secure device that may implement a system for signal validation for secure ranging in accordance with one or more implementations.

FIG. 2 illustrates an example secure device 104A that may implement a system for signal validation for secure ranging in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example secure device 104A may be implemented by one or more of the other devices 102B, 104A-B.

The secure device 104A includes a radio frequency (RF) antenna 210, a duplexer 220, a receiver 230, a transmitter 240, a processor 250, a clock 260, and a memory 270. In one or more implementations, one or more of the components represented in FIG. 2 may be integrated on one or more semiconductor substrates. For example, any/all of the receiver 230, transmitter 240, processor 250, clock 260, and/or memory 270 may be realized in a single chip or a single system on chip, or may be realized in a multi-chip chipset.

The RF antenna 210 may be suitable for transmitting and/or receiving signals (e.g., wireless signals) over a range of frequencies (e.g., 800 MHz, 900 MHz, 1.7 GHz, 2.1 GHz, 2.4 GHz, 2.6 GHz, 5 GHz, 60 GHz, etc.) and/or using dynamic frequency selection (DFS) at 5 GHz and/or other frequencies. Although a single RF antenna 210 is illustrated, additional RF antennas may be utilized. The duplexer 220 may provide isolation in a transmit band to facilitate avoiding saturation of the receiver 230.

The receiver 230 may include suitable logic circuitry and/or code that may be operable to receive and process signals from the RF antenna 210. The receiver 230 may, for example, be operable to amplify and/or down-convert received wireless signals. In some aspects, the receiver 230 may be operable to cancel noise in received signals and/or may be linear over a wide range of frequencies. The receiver 230 may be suitable to allow receipt of signals in accordance with a variety of wireless standards, such as to participate in the signal exchange discussed further below with respect to FIG. 3.

The transmitter 240 may include suitable logic circuitry and/or code that may be operable to process and transmit signals to the RF antenna 210. The transmitter 240 may, for example, be operable to up-convert baseband signals to RF signals and amplify RF signals. The transmitter 240 may be suitable to allow transmission of signals in accordance with a variety of wireless standards, such as to participate in the signal exchange discussed further below with respect to FIG. 3.

In one or more implementations, the processor 250 may be, may include, or may be a part of, a baseband processing circuit or a digital processing circuit. The processor 250 may include suitable logic, circuitry, interfaces, and/or code that may be operable to perform processing of signals, such as baseband signals. The processor 250 may, for example, generate control and/or feedback signals for configuring various components of the secure device 104A, such as the receiver 230 and the transmitter 240. In this regard, the processor 250 may receive signals from and provide signals to the receiver 230 and the transmitter 240.

In one or more implementations, the processor 250 may be operable to encode, decode, transcode, modulate, demodulate, encrypt, decrypt, scramble, descramble, and/or otherwise process data in accordance with one or more communication protocols. In one or more implementations, the processor 250 may retrieve (e.g., from the memory 270) and execute instructions to generate channel estimates, determine direct path signal acceptance thresholds, and generate ranging estimations (e.g., time of arrival estimations, line of sight distance estimations).

The processor 250 may also include suitable logic, circuitry, and/or code that enable processing data and/or controlling operations of the secure device 104A. In this regard, the processor 250 may be enabled to provide control signals to various other components of the secure device 104A. The processor 250 may also control transfers of data between various portions of the secure device 104A. Additionally, the processor 250 may enable implementation of an operating system or otherwise execute code to manage operations of the secure device 104A.

The clock 260 may include suitable logic, circuitry, interfaces, and/or code that are operable to generate a reference clock signal (e.g., a master clock signal). The reference clock signal may be used to synchronize and schedule operations performed by the various components of the secure device 104A. The clock 260 may also generate one or more oscillating signals of one or more frequencies, e.g. based on the reference clock signal. The oscillating signals may be referred to as local oscillator (LO) signals. In one or more implementations, the clock 260 may include one or more PLLs to detect and/or compensate for any drift in frequency in the LO signals. In some cases, the same PLL(s) may be used for transmitting and receiving. In other cases, different PLL(s) may be used for transmitting and receiving.

The memory 270 may include suitable logic, circuitry, and/or code that enable storage of various types of information such as received data, sounding parameters, collected samples, generated data, code, and/or configuration information. The memory 270 may include, for example, RAM, ROM, flash, and/or magnetic storage. Information stored in the memory 270 may be utilized for configuring the receiver 230, transmitter 240, processor 250, and/or clock 260. The memory 270 may store instructions retrievable and executable by the processor 250 to facilitate a time of arrival estimation.

In one or more implementations, the secure device 104A may include multiple sets of duplexers 220, receivers 230, and/or transmitters 240. Each set may be configured to perform the secure ranging operations described herein, and the processor 250 may be configured to reconcile the results of the secure ranging operations performed by each set.

In one or more implementations, one or more of the duplexer 220, receiver 230, transmitter 240, processor 250, clock 260, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
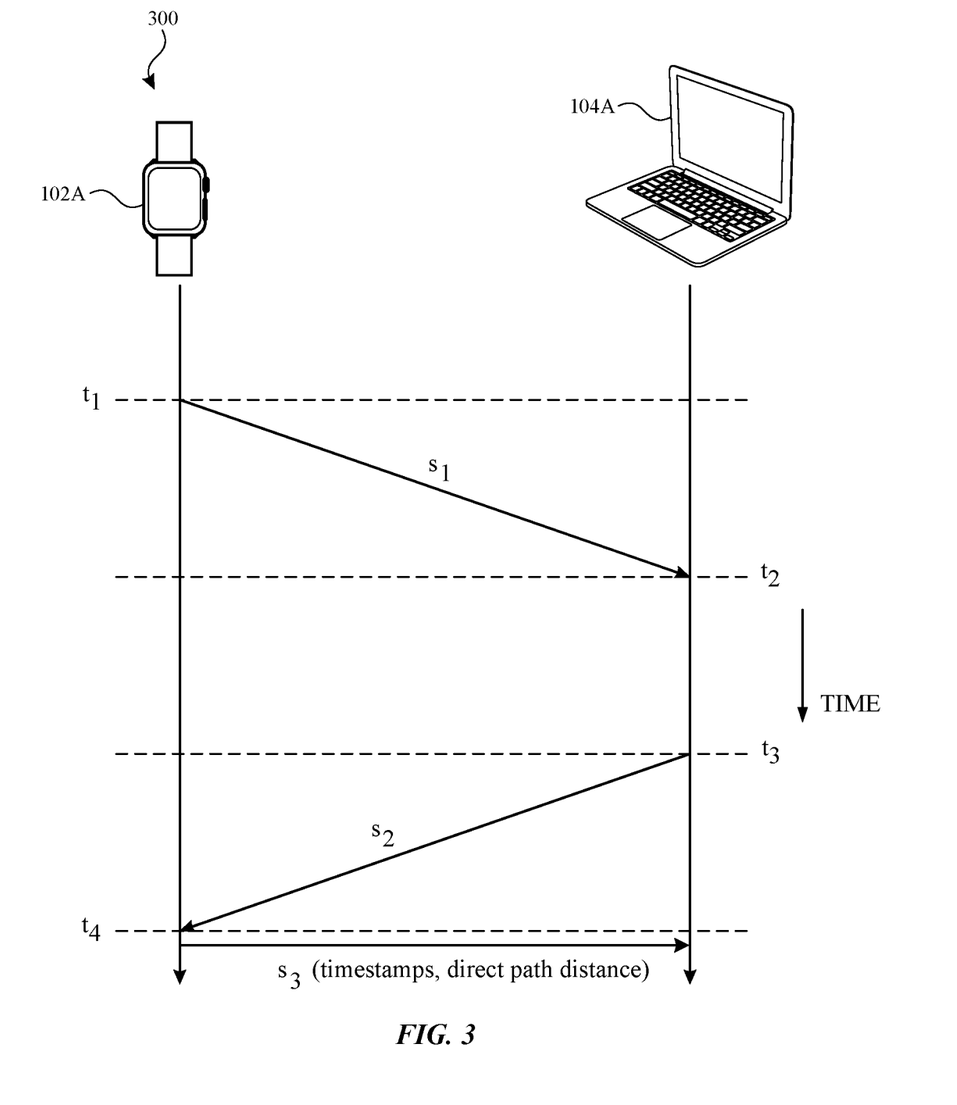
FIG. 3 illustrates a timing diagram of an example secure ranging signal exchange in accordance with one or more implementations.

FIG. 3 illustrates an example timing diagram 300 of an example signal exchange, such as a packet exchange, between the electronic device 102A and the secure device 104A to estimate a time of flight in accordance with one or more implementations. For explanatory purposes, the signal exchange is described herein with reference to the electronic device 102A and the secure device 104A of the network environment 100 of FIG. 1; however, the signal exchange is not limited to the devices 102A, 104A of the network environment 100 of FIG. 1. In one or more implementations, one or more of the other devices 102B, 104B of the network environment 100 may participate in the signal exchange. Further for explanatory purposes, the secure device 104A is depicted as the initiator device for the signal exchange, and the electronic device 102A is depicted as the responder device for the signal exchange; however, the electronic device 102A may also be the initiator device and the secure device 104A may be the responder device. In one or more implementations, the initiator device may be the one of the devices that has greater processing resources, power resources, and/or other resources, and/or the initiator device may be the device on which an access command/operation is being effectuated/performed. In one or more implementations, the initiator device may initiate the signal exchange by transmitting the first packet in a session setup period (not shown), and then the responder device transmits the first packet in the signal exchange (as shown in the timing diagram 300).

The time of flight estimate may be utilized to estimate a distance between the electronic device 102A and the secure device 104A. The time of flight may refer to the time it takes for a signal (e.g., a radio wave carried message) to propagate from the electronic device 102A to the secure device 104A. In one or more implementations, a time of flight estimation based on the signal exchange depicted in FIG. 3 may be dependent on the signal exchange being performed in a reciprocal channel. A channel may be reciprocal when the channel response experienced by a signal propagating from a first station (e.g., the electronic device 102A) to a second station (e.g., the secure device 104A) is the same as the channel response experienced by a signal propagating from the second station to the first station. For example, a channel, which may be a multi-path channel, between any the devices 102A, 104A can be reciprocal up to in-station filters, which can be calibrated and/or compensated for by the devices 102A, 104A.

In FIG. 3, the electronic device 102A transmits a first ranging signal $s_1$ (e.g., a first packet that may include one or more secure training sequences and/or short training sequences) to the secure device 104A at a time $t_1$ and the secure device 104A receives the first ranging signal $s_1$ from the electronic device 102A at a time $t_2$. The secure device 104A may validate a detected direct path signal of the first ranging signal $s_1$, as is discussed further below with respect to FIG. 5. The secure device 104A then transmits a second ranging signal $s_2$ (e.g., a second packet) to the electronic device 102A at a time $t_3$ and the electronic device 102A receives the second signal $s_1$ at a time $t_4$. The electronic device 102A may similarly validate the detected direct path signal for $s_2$, as is discussed further below with respect to FIG. 5.

The electronic device 102A may then transmit a third ranging signal $s_3$, which may include timestamps corresponding to the time that $s_1$ was transmitted and the time that $s_2$ was received, as well as the direct path distance determined for $s_2$. The secure device 104A may receive the third ranging signal $s_3$ and may validate the detected direct path signal for $s_3$, as is discussed further below with respect to FIG. 5.

In the case that the channel between the electronic device 102A and the electronic device 102B is, or can be considered to be, reciprocal, the time of flight may be provided by the following relation:

$$TOF = t_2 - t_1 = t_4 - t_3 = \frac{(t_2 - t_1) + (t_4 - t_3)}{2} = \frac{(t_4 - t_1) + (t_3 - t_2)}{2}$$

Since the time difference $t_4-t_1$ is associated only with the electronic device 102A (e.g., transmission time and reception time at the electronic device 102A) and the time difference $t_3-t_2$ is associated only with the secure device 104A, the devices 102A, 104A need not be synchronized in time in order to perform the time of flight estimation. However, in one or more implementations the devices 102A, 104A may be synchronized, in which case the time of flight estimation may be performed using only a single transmitted signal, such as over an ultra-wideband channel.

In determining the time of flight, the transmit times $t_1$ and $t_3$ are known by the transmitting devices, since the devices 102A, 104A know the respective times at which they transmitted their respective signal. Thus, the time of flight estimation involves time of arrival estimations of the receive times $t_2$ and $t_4$ by the devices 102A, 104A, and may be determined by the secure device 104A upon receiving the third ranging signal $s_3$.

However, the secure device 104A may further validate the ranging signals $s_1$, $s_2$, and $s_3$, in aggregate, by verifying that the positions of the validated direct path signals for the ranging signals $s_1$, $s_2$, and $s_3$, e.g. the direct path distances, generally coincide, such as are within a threshold distance of one another, as is discussed further below with respect to FIG. 6. In this manner, the subject system provides multiple additional layers of security to secure ranging to mitigate, for example, man-in-the-middle attacks.

Figure 4:
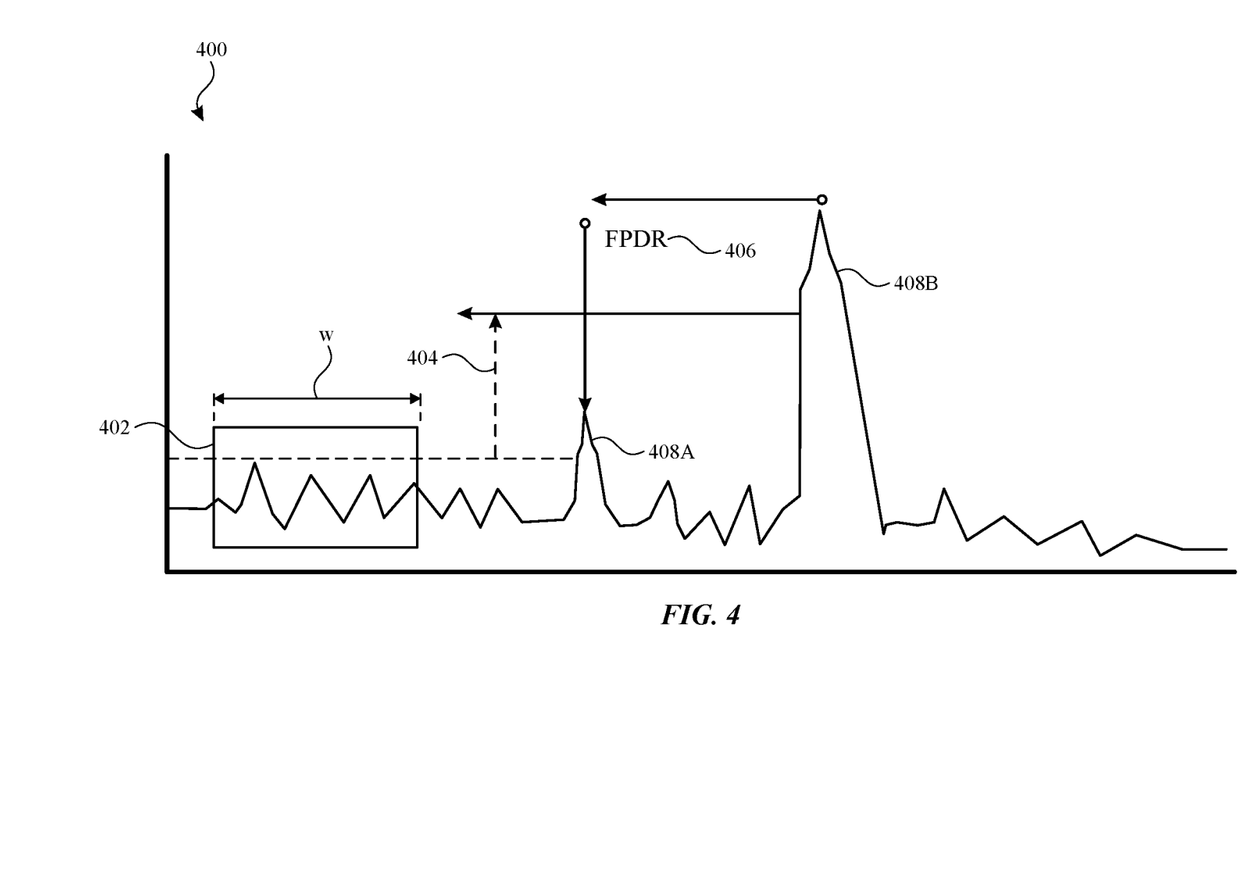
FIG. 4 illustrates an example channel impulse response in accordance with one or more implementations.

FIG. 4 illustrates an example channel impulse response 400 in accordance with one or more implementations. The channel impulse response 400 may be generated from temporally sequential time domain signal samples output from an inverse fast Fourier transform (IFFT) performed on a correlator or frequency domain match filter output for a received signal. Thus, the x-axis of the channel impulse response 400 may correspond to time while the y-axis of the channel impulse response 400 may correspond to signal level. Since the channel impulse response 400 corresponds to a multipath channel, the channel impulse response includes multiple peaks 408A-B which correspond to samples having highest signal levels relative to their left and right neighboring samples. In the channel impulse response 400, the peak 408B has a higher signal level than the peak 408A.

As shown in FIG. 4, a configurable noise level evaluation window 402 may be applied to the initial samples of the channel impulse response 400 and may span a configurable number of samples. As is discussed further below with respect to FIG. 5, the average noise level of the samples in the noise level evaluation window 402 may be used to determine a direct path signal acceptance level 404. For example, the direct path signal acceptance level 404 may be set as the average noise level plus a threshold amount.

In one or more implementations, the larger the size of the noise level evaluation window 402, the more likely that the average noise level will be able to account for any noise injected by a third party. However, if the size of the noise level evaluation window 402 exceeds a particular number of samples, the noise level evaluation window 402 may encroach on the detected peaks 408A-B. In one or more implementations, the noise level evaluation window 402 may be configured to be a particular distance from the maximum peak 408B.

The subject system may further utilize a configurable direct path dynamic range threshold 406 that indicates an amount by which the detected direct path signal can differ from the maximum signal level for the channel impulse response 400, e.g. the signal level corresponding to the peak 408B. The direct path dynamic range threshold 406 may be configurable to allow for detection of direct path signals with lower signal levels; however, setting the direct path signal dynamic range too high may result in a peak created by injected noise being detected as the direct path signal. In one or more implementations, satisfying the direct path signal acceptance level may supersede satisfying the direct path dynamic range threshold, or vice-versa. In one or more implementations, a detected direct path signal may need to satisfy both the direct path signal acceptance level and the direct path dynamic range threshold in order to be validated.

Figure 5:
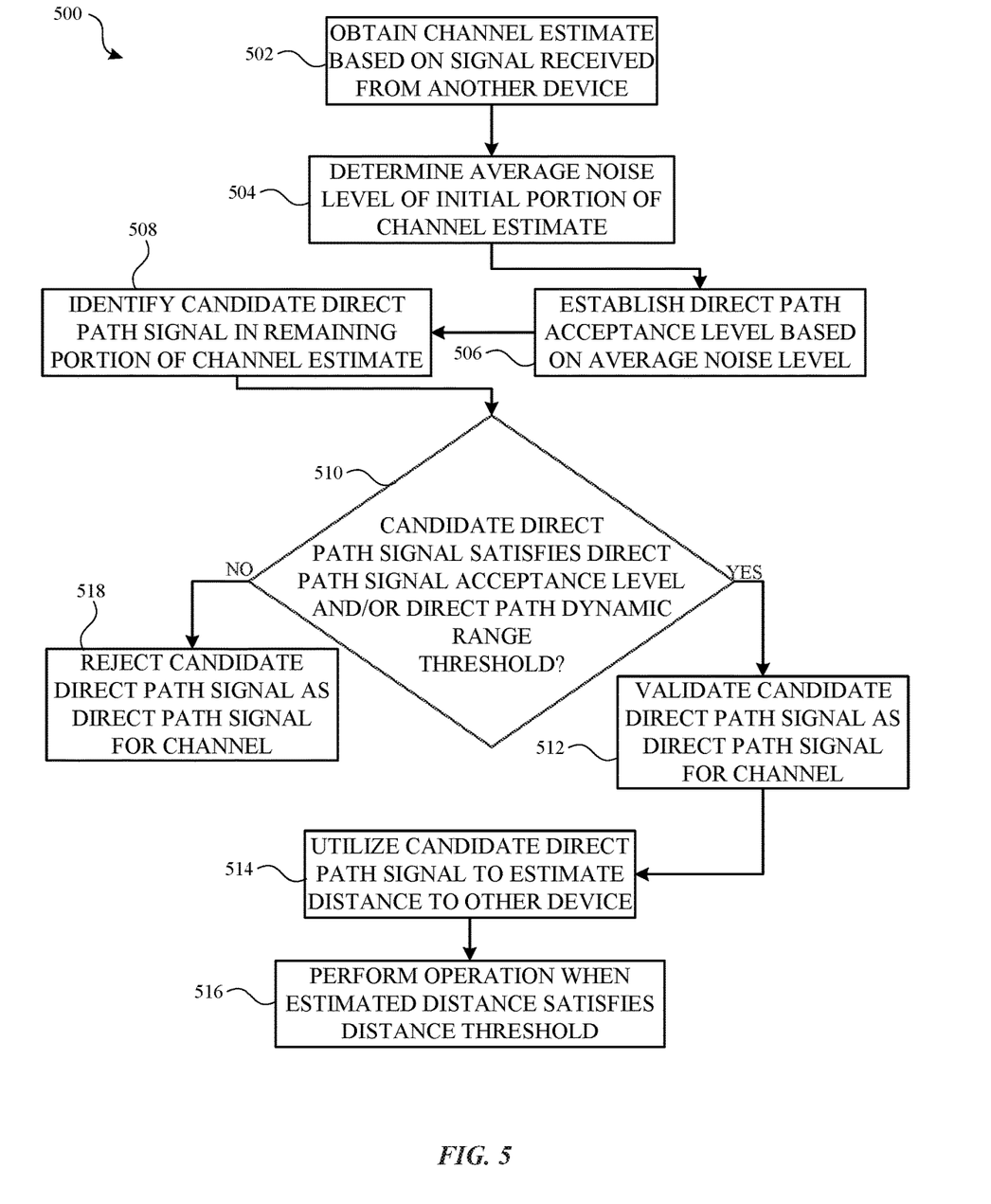
FIG. 5 illustrates a flow diagram of an example process of validating a direct path signal of a channel estimate in accordance with one or more implementations.

FIG. 5 illustrates a flow diagram of an example process 500 of validating a direct path signal of a channel estimate in accordance with one or more implementations. For explanatory purposes, the process 500 is primarily described herein with reference to the secure device 104A of FIGS. 1-2. However, the secure device 104A is presented as an exemplary device and the operations described herein may be performed by any suitable device. For example, the process 500 may be performed by the secure device 104B, or generally any electronic device. Further for explanatory purposes, the operations of the process 500 are described herein as occurring in serial, or linearly. However, multiple operations of the process 500 may occur in parallel. In addition, the operations of the process 500 need not be performed in the order shown and/or one or more of the operations of the process 500 need not be performed and/or can be replaced by other operations.

The process 500 may begin when the secure device 104A obtains a channel estimate, such as a channel impulse response, based on a signal received from another device (502), such as the electronic device 102A. The received signal may be associated with a request from the other device to effectuate an operation at the secure device 104A, where the request is associated with a particular distance threshold, such as unlocking the secure device 104A. In one or more implementations, the channel estimate may be generated from an output of an inverse fast Fourier transform (IFFT) performed on a correlator or frequency domain match filter output for the signal.

The secure device 104A determines an average noise level of an initial portion of the channel estimate (504). For example, the secure device 104A may determine the average noise level for the noise level evaluation window 402. The secure device 104A establishes a direct path signal acceptance level for the channel estimate based on the determined average noise level (506). For example, the direct path signal acceptance level may be set as the average noise level plus a threshold amount. The secure device 104A identifies a candidate direct path signal in the remaining portion of the channel estimate, e.g. a portion that is distinct from and temporally subsequent to the noise level evaluation window 402 (508). For example, the secure device 104A may perform one or more direct path signal detection algorithms to detect the candidate direct path signal.

The secure device 104A determines whether the candidate direct path signal satisfies the direct path signal acceptance level and/or the direct path dynamic range threshold (510). For example, the candidate direct path signal may satisfy the direct path signal acceptance level when the signal level corresponding to the candidate direct path signal (e.g., the signal level of the peak corresponding to the candidate direct path signal) satisfies the direct path signal acceptance level. The candidate direct path signal may satisfy the direct path dynamic range threshold when the signal level corresponding to the candidate direct path signal is within the direct path dynamic range threshold of the maximum signal level for the channel estimate, e.g. the signal level corresponding to the largest peak for the channel estimate. The subject system may be configurable as to whether the candidate direct path signal is required to satisfy one or both of the direct path signal acceptance level and the direct path dynamic range threshold.

When the candidate direct path signal satisfies the direct path signal acceptance level and/or the direct path dynamic range threshold (510), the secure device 104A validates the candidate direct path signal as the direct path signal for the channel (512). The secure device 104A may then utilize the validated direct path signal to estimate the distance to the other device (514). For example, the secure device 104A may utilize the candidate direct path signal in the time of arrival estimation discussed above with respect to FIG. 3. In one or more implementations, if the secure device 104A and the other device are synchronized, the secure device 104A may estimate the distance to the other device directly from the validated direct path signal. The secure device 104A may then effectuate the associated operation, such as unlocking the secure device 104A, when the estimated distance satisfies the distance threshold associated with the operation (516).

When the candidate direct path signal does not satisfy the direct path signal acceptance level and/or the direct path dynamic range threshold (510), the secure device 104A rejects the candidate direct path signal as the direct path signal for the channel (518) and consequently does not effectuate the requested operation.

Figure 6:
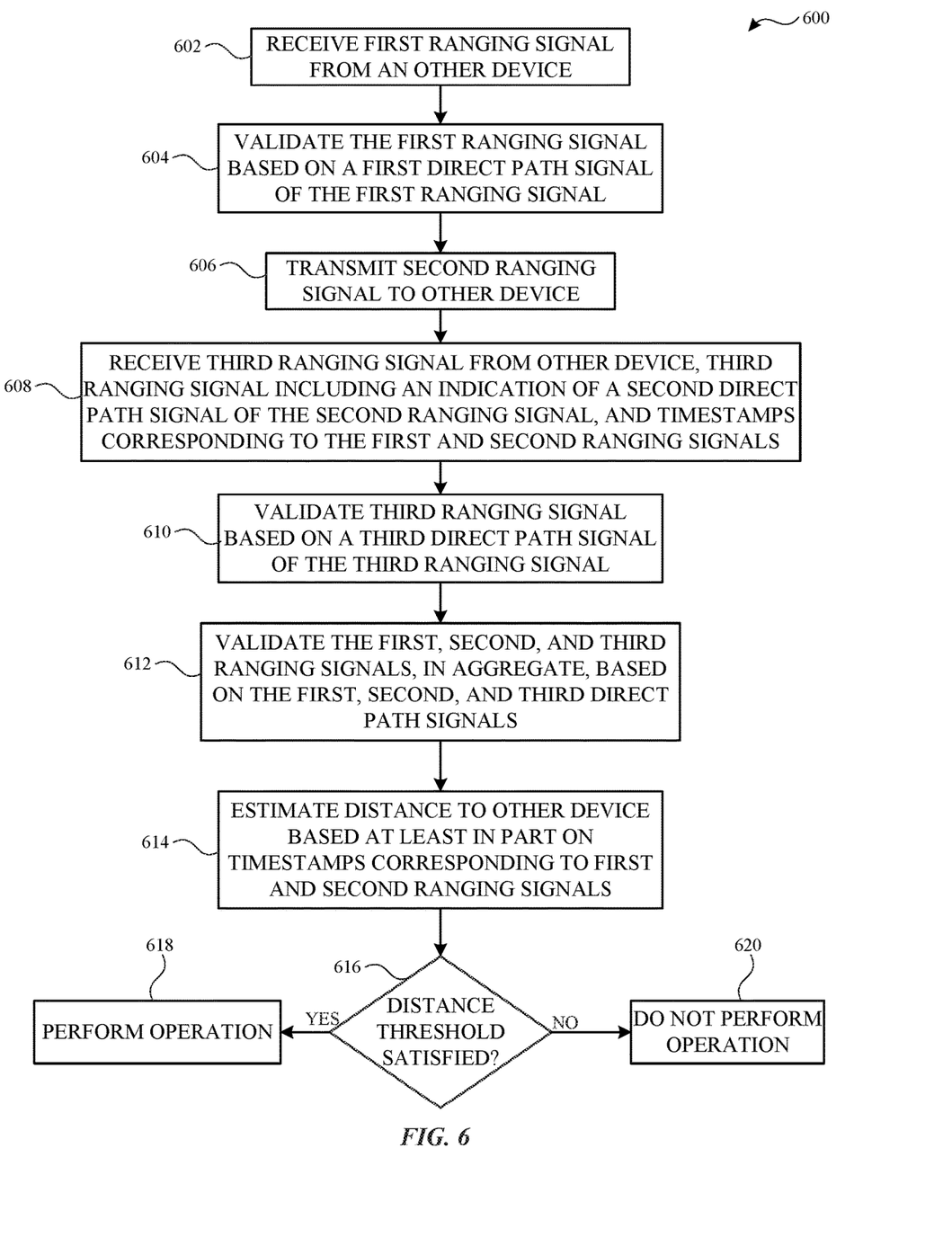
FIG. 6 illustrates a flow diagram of an example process of validating ranging signals in accordance with one or more implementations.

FIG. 6 illustrates a flow diagram of an example process 600 of validating ranging signals in accordance with one or more implementations. For explanatory purposes, the process 600 is primarily described herein with reference to the secure device 104A of FIGS. 1-2. However, the secure device 104A is presented as an exemplary device and the operations described herein may be performed by any suitable device. For example, the process 600 may be performed by the secure device 104B, or generally any electronic device. Further for explanatory purposes, the operations of the process 600 are described herein as occurring in serial, or linearly. However, multiple operations of the process 600 may occur in parallel. In addition, the operations of the process 600 need not be performed in the order shown and/or one or more of the operations of the process 600 need not be performed and/or can be replaced by other operations.

The process 600 may begin when the secure device 104A receives a first ranging signal from another device (602), such as the electronic device 102A. The first ranging signal may be associated with a request from the other device to effectuate an operation at the secure device 104A that is associated with a particular distance threshold, such as unlocking the secure device 104A. The secure device 104A may validate the first ranging signal based on a first direct path signal of the first ranging signal (604). For example, the secure device 104A may perform part or all of the process 500 to validate the first direct path signal of the first ranging signal. If the secure device 104A cannot validate the first direct path signal of the first ranging signal, the secure device 104A may reject the first ranging signal and/or may wait for another transmission of the first ranging signal.

The secure device 104A transmits a second ranging signal to the other device (606), such as the electronic device 102A. The secure device 104A receives a third ranging signal from the other device, such as the electronic device 102A, where the third ranging signal includes an indication of a second direct path signal of the second ranging signal (such as a direct path distance of the second direct path), and timestamps corresponding to the time of transmission of the first ranging signal and the time of reception of the second ranging signal (608).

The secure device 104A may validate the third ranging signal based on a third direct path signal of the third ranging signal (610). For example, the secure device 104A may perform part of or all of the process 500 to validate the third direct path signal of the third ranging signal. If the secure device 104A cannot validate the third direct path signal of the third ranging signal, the secure device 104A may reject the third ranging signal and/or may wait for another transmission of the third ranging signal.

The secure device 104A may also validate the first, second, and third ranging signals, in aggregate, based on the first, second, and third direct path signals (612). For example, the secure device 104A may compare the direct path distances of the first, second, and third direct path signals to confirm that the locations of the first, second, and third direct path signals are within a threshold distance of one another. In one or more implementations, the direct path distances may correspond to the positions of the direct path signals within their respective channel estimates.

When the secure device 104A can validate the first, second, and third ranging signals, in aggregate (612), the secure device 104A estimates the distance to the other device based at least in part on the timestamps corresponding to the first and second ranging signals (614), as is discussed further above with respect to FIG. 3. When the secure device 104A cannot validate, the first, second, and third ranging signals, in aggregate, the secure device 104A may not perform the requested operation and/or may not estimate the distance to the other device.

When the distance threshold is satisfied (616), the secure device 104A may perform the associated operation (618), such as unlocking the secure device 104A. When the distance threshold is not satisfied (616), the secure device 104A may block, and/or may not perform the requested operation (620).

For explanatory purposes, the requested operation is described herein as unlocking the secure device 104A. However, the requested operation can be any operation that may be performed and/or effectuated by the secure device 104A.

Figure 7:
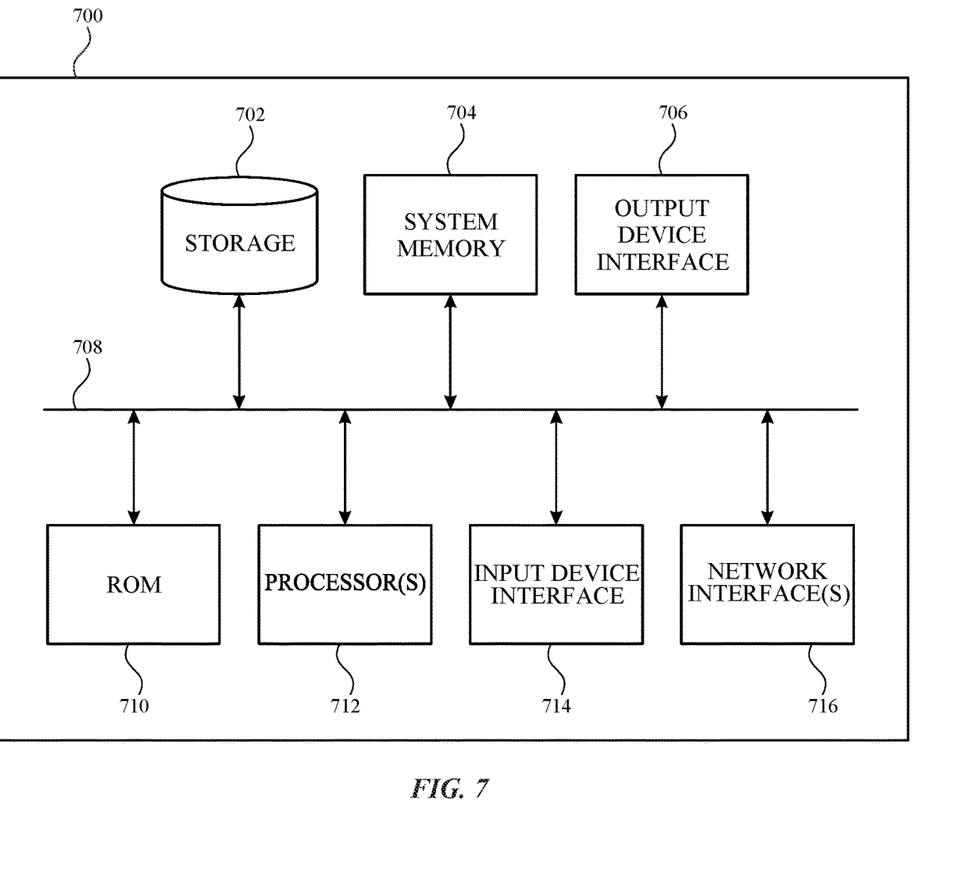
FIG. 7 illustrates an example electronic system with which aspects of the subject technology may be implemented in accordance with one or more implementations.

FIG. 7 illustrates an example electronic system 700 with which aspects of the subject technology may be implemented in accordance with one or more implementations. The electronic system 700 can be, and/or can be a part of, one or more of the electronic devices 102A-B and/or one or more of the secure devices 104A-B shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

As described above, aspects of the present technology may include the gathering and use of data available from various sources to improve signal validation for secure ranging. The present disclosure contemplates that in some instances, this gathered data may include personal information data that uniquely identifies or can be used to contact or locate a specific person. Such personal information data can include financial data, demographic data, location-based data, telephone numbers, email addresses, social networking ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
a memory; and
at least one processor configured to:
obtain a channel estimate based at least in part on a signal received from an other device over a channel;
determine an average noise level of a beginning portion of the channel estimate;
establish a direct path signal acceptance level for the channel estimate based at least in part on the average noise level;
identify a candidate direct path signal for the channel in a remaining portion of the channel estimate; and
validate the candidate direct path signal as a direct path signal for the channel when a signal level corresponding to the candidate direct path signal satisfies the direct path signal acceptance level, otherwise reject the candidate direct path signal.

2. The device of claim 1, wherein the at least one processor is further configured to:
add a threshold amount to the average noise level of the beginning portion of the channel estimate to establish the direct path signal acceptance level.

3. The device of claim 2, wherein the at least one processor is further configured to:
validate the candidate direct path signal as the direct path signal for the channel when the signal level corresponding to the candidate direct path signal satisfies the direct path signal acceptance level and the signal level corresponding to the candidate direct path signal satisfies a direct path dynamic range threshold.

4. The device of claim 3, wherein the signal level corresponding to the candidate direct path signal satisfies the direct path dynamic range threshold when the signal level corresponding to the candidate direct path signal is within the direct path dynamic range threshold of a maximum signal level of the channel estimate.

5. The device of claim 3, wherein the at least one processor is configured to adjust at least one of: the direct path dynamic range threshold, a size of the beginning portion of the channel estimate, or the threshold amount added to the average noise level.

6. The device of claim 1, wherein the channel estimate comprises a channel impulse response and the average noise level for the beginning portion of the channel estimate comprises an average noise level for the beginning portion of the channel estimate.

7. The device of claim 1, wherein the remaining portion of the channel estimate is distinct from, and temporally after, the beginning portion of the channel estimate.

8. The device of claim 1, wherein the at least one processor is further configured to:
when the candidate direct path signal is validated as the direct path signal for the channel, use the candidate direct path signal to estimate a distance to the other device; and
enable an operation when the estimated distance to the other device satisfies a distance threshold.

9. A method comprising:
generating a channel impulse response for a channel, the channel impulse response comprising signal samples;
determining an average noise level for a first set of the signal samples of the channel impulse response;
establishing a direct path signal acceptance level based at least in part on the average noise level;
identifying a signal sample of a second set of the signal samples of the channel impulse response, the identified signal sample corresponding to a candidate direct path signal for the channel; and
validating the candidate direct path signal as a direct path signal for the channel when a signal level corresponding to the identified signal sample satisfies the direct path signal acceptance level, otherwise rejecting the candidate direct path signal as the direct path signal for the channel.

10. The method of claim 9, wherein the signal samples of the channel impulse response are temporally sequential and the second set of the signal samples of the channel impulse response is distinct from and temporally subsequent to the first set of the signal samples of the channel impulse response.

11. The method of claim 9, further comprising:
receiving a signal over the channel from an other device; and
obtaining the signal samples by converting a frequency domain match filter output for the received signal to a time domain representation using an inverse transform.

12. The method of claim 11, further comprising:
when the candidate direct path signal is validated as the direct path signal for the channel, utilizing the identified signal sample to estimate a distance to the other device; and
enabling performance of an operation when the estimated distance to the other device satisfies a distance threshold.

13. The method of claim 9, wherein establishing the direct path signal acceptance level comprises:
adding a threshold amount to the average noise level for the first set of the signal samples of the channel impulse response to establish the direct path signal acceptance level.

14. The method of claim 9, wherein validating the candidate direct path signal further comprises:
validating the candidate direct path signal as a direct path signal for the channel when the signal level corresponding to the identified signal sample satisfies the direct path signal acceptance level and the signal level corresponding to the identified signal sample is within a direct path dynamic range threshold of a maximum signal level for the samples of the second set of samples.

15. The method of claim 14, wherein at least one of the direct path dynamic range threshold or a number of signal samples in the first set of the signal samples is configurable.

16. A non-transitory machine-readable medium comprising code that, when executed by one or more processors, causes the one or more processors to perform operations, the code comprising:

code to generate a channel impulse response for a channel, the channel impulse response comprising signal samples;

code to determine an average noise level for a first set of the signal samples of the channel impulse response;

code to establish a direct path signal acceptance level based at least in part on the average noise level;

code to identify a signal sample of a second set of the signal samples of the channel impulse response, the identified signal sample corresponding to a candidate direct path signal for the channel; and code to validate the candidate direct path signal as a direct path signal for the channel when a signal level corresponding to the identified signal sample satisfies the direct path signal acceptance level, otherwise rejecting the candidate direct path signal as the direct path signal for the channel.

17. The non-transitory machine-readable medium of claim 16, wherein the signal samples of the channel impulse response are temporally sequential and the second set of the signal samples of the channel impulse response is distinct from and temporally subsequent to the first set of the signal samples of the channel impulse response.

18. The non-transitory machine-readable medium of claim 16, wherein the code further comprises:

code to receive a signal over the channel from an other device; and code to obtain the signal samples by converting a frequency domain match filter output for the received signal to a time domain representation using an inverse transform.

19. The non-transitory machine-readable medium of claim 18, wherein the code further comprises:

when the candidate direct path signal is validated as the direct path signal for the channel, code to utilize the identified signal sample to estimate a distance to the other device; and code to enable performance of an operation when the estimated distance to the other device satisfies a distance threshold.

20. The non-transitory machine-readable medium of claim 16, wherein the code to establish the direct path signal acceptance level comprises:

code to add a threshold amount to the average noise level for the first set of the signal samples of the channel impulse response to establish the direct path signal acceptance level.

\* \* \* \* \*